United States Patent
Lawrence et al.

(10) Patent No.: US 7,507,277 B2
(45) Date of Patent: Mar. 24, 2009

(54) SURFACE FOR PROMOTING DROPLET FORMATION

(75) Inventors: Christoper Robert Lawrence, Hants (GB); Andrew Richard Parker, Oxford (GB)

(73) Assignee: QinetiQ Limited (GB)

( * ) Notice: Subject to any disclaimer, the term of this patent is extended or adjusted under 35 U.S.C. 154(b) by 0 days.

(21) Appl. No.: 12/129,174

(22) Filed: May 29, 2008

(65) Prior Publication Data

US 2008/0274359 A1 Nov. 6, 2008

Related U.S. Application Data

(63) Continuation of application No. 10/475,783, filed as application No. PCT/GB02/00671 on Feb. 18, 2002, now Pat. No. 7,402,195.

(30) Foreign Application Priority Data

Apr. 23, 2001 (GB) .................. 0109814.4

(51) Int. Cl.
*B01D 53/02* (2006.01)
(52) U.S. Cl. ............................ 96/108; 95/117; 428/141
(58) Field of Classification Search .................. 96/108; 95/117; 428/141
See application file for complete search history.

(56) References Cited

U.S. PATENT DOCUMENTS

| 2,413,101 | A | 12/1946 | Delano |
| 3,318,107 | A | 5/1967 | Riley et al. |
| 3,336,206 | A | 8/1967 | Sasaki et al. |
| 5,145,758 | A | 9/1992 | Kossmehl et al. |
| 5,443,727 | A | 8/1995 | Gagnon |

FOREIGN PATENT DOCUMENTS

| EP | 1 160 262 | 5/2001 |
| EP | 1 245 383 | 2/2002 |
| EP | 1 188 481 | 3/2002 |
| JP | 64 058722 | 3/1989 |
| JP | 407256001 | 10/1995 |
| JP | 9-131914 | 5/1997 |
| JP | 10-24997 | 9/1998 |
| JP | 2000-001620 | 1/2000 |
| JP | 2000-308603 | 11/2000 |
| WO | WO 99/23437 | 5/1999 |
| WO | WO 99/57185 | 11/1999 |
| WO | WO 02/066253 | 8/2002 |

*Primary Examiner*—Robert A Hopkins
(74) *Attorney, Agent, or Firm*—McDonnell Boehnen Hulbert & Berghoff LLP

(57) ABSTRACT

A surface (30) suitable for promoting the formation of droplets of liquid (35) is provided comprising alternating regions of liquid repelling (32) and liquid attracting (33) material in at least one direction across the surface wherein the diameter of the droplets is controlled by the size of the smallest dimension of the liquid attracting material. The surface (30) may be textured and/or form a pattern. Also disclosed are a method and a system of collecting a liquid (35) carried by or condensed out of a vapor comprising passing a vapor across such a surface (30) and a method of purifying a liquid by passing a vapor containing droplets of a liquid over such a surface.

12 Claims, 4 Drawing Sheets

SURFACE FOR PROMOTING DROPLET FORMATION

This application is a continuation of U.S. patent application Ser. No. 10/475,783 filed on Oct. 23, 2003, now U.S. Pat. No. 7,402,195 which is a 371 application of PCT/GB02/00671 filed on Feb. 18, 2002, which claims priority to United Kingdom patent application number 0109814.4 filed on Apr. 23, 2001.

BACKGROUND OF THE INVENTION (1) Field of the Invention

This invention relates to a surface suitable for promoting the formation of droplets of a liquid on said surface in such a manner as to control the droplet dimensions. The invention is in particular suitable for enabling collection of that liquid from a wind-blown fog or mist.

(2) Description of the Art

It is well-known that certain materials exhibit surfaces that attract water whilst others actively repel it, such materials being described as hydrophilic and hydrophobic respectively. It is also still known that water is attracted or repelled due to the fact that it is a polar liquid, and that any similar polar liquid will be influenced in the same manner by such surfaces. It should also be noted that non-polar liquids such as oils will be attracted to a hydrophobic surface and repelled by a hydrophilic surface.

There are a number of situations where the collection and storage of liquids is of importance. One such situation is where the environment is arid and there is no easily accessible source of water. Another situation could be when chemicals are in vapour form during distillation.

SUMMARY OF THE INVENTION

It is an object of the present invention to provide a surface suitable for promoting the formation of liquid droplets of a tailored size. It is a further object to collect said droplets.

According to a first aspect of the present invention a surface suitable for promoting the formation of droplets of a liquid comprises regions of liquid repelling and liquid attracting material alternating in at least one direction across the surface whereby the diameter of the droplets is controlled by the size of the smallest dimension of the liquid attracting material.

If the liquid is polar, hydrophilic regions of the surface attract the polar liquid and the hydrophobic regions repel the polar liquid. If the liquid is an oil, the hydrophobic regions attract the liquid and the hydrophilic regions repel the liquid.

The smallest dimension (the width) of the liquid attracting regions determines the size of the droplet to be formed. There is a maximum diameter that a stable droplet can attain which is related to the width of the liquid attracting regions. The liquid repelling regions separating the liquid attracting regions are preferably of at least the same width, so as to prevent overlap of droplets on neighbouring liquid attracting regions.

Preferably, the liquid attracting regions take the form of discrete regions on a liquid repelling substrate i.e. each liquid attracting region is isolated from other liquid attracting regions. This enables the droplets to form in isolation, constraining them in two dimensions and limiting their surface contact area with the liquid attracting substrate (and hence their adhesion to the surface).

In a preferred embodiment, the surface is textured such that the regions of liquid attracting material protrude in relation to the regions of liquid repelling material. This allows for the droplets, when formed, to sit proud in relation to the liquid repelling regions, and encourages detachment of the droplets from the liquid attracting material when a specified droplet size is attained i.e. when the diameter of the droplet has reached its maximum stable size.

Preferably the said smallest dimension of the liquid attracting material regions is more than 150 μm, more preferably more than 200 μm, and for certain applications is preferably more than 300 μm, 400 μm, 500 μm, or even at least 600 μm. Preferably the said smallest dimension is in the said one direction of the surface. If the said smallest direction is in another direction from the said one direction, then in the said one direction the smallest dimension of the liquid attracting material region in the said one direction preferably also has the stated preferred minimum sizes (more than 150, 200, 300, 400, 500, or at least 600 μm).

The said surface is preferably substantially planar. It is also envisaged that the surface may be curved, e.g. concave or convex, or be a combination of curved and substantially planar parts. Where we say that a surface is substantially planar, this specifically includes substantially planar surfaces with regions projecting or protruding from the surface, e.g. protruding above the surface.

The surface is preferably designed in use to be inclined to the horizontal plane. This is described in more detail below with reference to other categories of the invention. It is mentioned here because, especially where the surface is substantially planar, the said one direction of the said surface is preferably the direction of the surface that defines the incline. More specifically, when the surface is inclined the angle of inclination is preferably defined as the angle between the horizontal and any line drawn along the surface in the said one direction.

Preferably the said smallest dimension of the liquid attracting region is at most 5 mm, more preferably at most 4 mm, and for certain applications is preferably at most 3 mm, 2 mm, 1 mm, or 0.8 mm (800 μm).

Where we talk about the smallest dimension of the liquid attracting region this will typically be the width, depending on the shape of the region. Thus, for example if the liquid attracting regions are in the shape of stripes, it will be the width of the stripes. Similarly if the liquid attracting regions are in the shape of discrete dots, it will be the width or diameter of the dots. For other less regular shapes it will be whatever is the smallest dimension in any direction. Preferably where there are a plurality of liquid attracting regions these will all be of similar shape and size. However it is envisaged that combinations of shapes and sizes of liquid attracting regions could also be used.

The liquid repelling regions are preferably at least as wide as the liquid attracting regions, and possibly twice as wide. Preferably the width or distance of liquid repelling region separating adjacent liquid attracting regions is at least 400 μm, more preferably at least 600 μm, especially at least 800 μm, or even at least 1 or 2 mm.

As mentioned above the smallest dimension of the liquid attracting regions control the diameter of the droplets formed on the surface. This can best be explained by considering a preferred substantially planar surface in its preferred use position in which it is inclined to the horizontal. In this orientation, when small liquid droplets from a vapour adjacent the surface strike the inclined surface, if they strike a liquid attracting region then they may form a droplet attached to the liquid attracting region, but if they strike a liquid repelling region they will roll down the inclined surface to the nearest liquid attracting region. The droplets grow, by joining with other droplets that attach to the same liquid attracting region, until they reach a point at which their surface contact area covers the liquid attracting region. Beyond this size the droplets are gaining in mass without any increase in contact area, so that the droplet has to move into the liquid repelling regions. As this happens the force of gravity increases without any increase in surface adhesion, causing the droplet to move down the inclined slope. If the surface is in a calm environment the droplets will fall directly down the slope, but if the surface is facing into a headwind the droplets may be blown randomly across the surface by the wind. Preferably the surface spacing and the size of the liquid attracting regions is sufficiently large that the droplets will roll down the slope only once they are sufficiently heavy to roll directly downwards even against a headwind.

According to a second aspect of the present invention a method of collecting a liquid carried by or condensed out of a vapour comprises passing a vapour across a surface; and collecting droplets of liquid formed on the surface in collecting means; wherein the surface comprises alternating regions of liquid repelling and liquid attracting material in at least one direction across the surface and the collecting means is disposed so as to collect drops formed on the surface.

The surface will usually be a man-made surface, and the method may comprise an initial step of selecting the smallest dimension of the liquid attracting regions so as to determine the droplet size having regard to the prevailing environmental conditions.

Throughout this specification, the term vapour is used to embrace media both in an entirely gaseous state and also in which liquid droplets are suspended in the gas forming for example a fog or a mist.

Preferably the surface is inclined to the horizontal plane. This enables the droplets to flow under the influence of gravity towards the collecting means which is a container of some description.

According to a third aspect of the present invention a system for collecting a liquid comprises a surface having alternating regions of liquid repelling and liquid attracting material in at least one direction across the surface; and collection means, whereby on the movement of a vapour across the surface, droplets within the vapour collect into larger droplets on the surface and are collected by the collection means.

In a preferred method and system according to the invention for collecting a liquid, the surface is preferably inclined to the horizontal plane by an angle of at least 5°, more preferably at least 10°. For certain applications the surface is preferably inclined by at least 20°, 30°, or even 40°. Preferably the surface is inclined at most 90°, especially at most 80°, or sometimes at most 70°. The angle of incline, like the width of the liquid attracting regions, is one of the factors determining when a droplet forming on the surface will roll down the slope for collection.

The surface, and the method and system for collecting a liquid are particularly applicable for collecting liquid from a vapour that is moving across the surface. This will be the case, for example in a headwind.

The behaviour of droplets of liquid falling on various surfaces, particularly where inclined into the headwind may be described as follows. For a vapour carrying headwind striking an entirely liquid attracting surface or an entirely liquid repelling surface, the liquid droplets would form on the surface in various sizes but would not amalgamate. These would therefore be blown in random directions across the surface by the headwind. For the surface of the present invention alternate regions of liquid attracting and repelling regions are provided. Droplets will either strike the liquid attracting regions and stay there, or roll to the nearest liquid attracting region if they initially land on a liquid repelling region. These droplets amalgamate until they are so large that no further purchase on the liquid attracting region is possible. At this time they will roll away (if the surface is inclined).

Where the surface is inclined it is preferably inclined to face any headwind. Typical preferred headwinds according to the invention may be at most, or of the order of 5 ms$^{-1}$, 10 ms$^{-1}$, 15 ms$^{-1}$ or 20 ms$^{-1}$. The headwind is another factor that affects when a droplet forming on the surface will roll down the slope for collection: too large a headwind (for the size of drop and angle of surface incline) will cause a drop to be randomly blown across the surface, rather than rolling directly down for collection.

Where reference is made to "headwind" this may be in a natural environment, or in a controlled environment such as a distillation or a dehumidifier unit.

Preferably the smallest dimension of the liquid attracting regions is selected so that it can be used in a variety of headwinds, by appropriate variation of slope, such that in this controlled manner the droplets always grow to a sufficiently large size before rolling down the slope to be heavy enough to roll directly down the slope even against the headwind.

Preferably the arrangement of liquid attracting and repelling regions on the surface is such that along any line drawn along the surface in the said one direction there will be alternating liquid attracting and liquid repelling regions. The said one direction is preferably the direction which together with the horizontal defines the angle of tilt, so that with this arrangement any drop rolling down the slope in the said one direction will always meet a liquid attracting region as it rolls. This arrangement can be for example provided by stripes of liquid attracting and repelling regions crossing, preferably perpendicular to the said one direction. As another example there may be mentioned discrete portions, e.g. dots, of liquid attracting regions in a surround of liquid repelling material, the liquid attracting discrete portions being offset laterally to each other relative to the said one direction. Thus, dots in adjacent rows may be staggered with respect to each other so as to prevent there being a clear "uphill" path of liquid repelling regions along which droplets could be blown away.

In the method of collecting a liquid according to the present invention, and in the system for collecting a liquid according to the present invention the path into the collecting means of substantially all the liquid is preferably across both liquid attracting and liquid repelling regions.

The aforementioned method and/or system for collecting a liquid may be a water collection method or system being used or intended for use in an arid/desert environment and adapted to collect at least 100 ml, preferably at least 0.5 l and ideally at least 1 l per week.

According to a fourth aspect of the present invention a method of spreading a liquid across a surface comprises providing a surface having alternating regions of liquid repelling and liquid attracting material in at least one direction across the surface; placing a liquid on the surface; and spreading the liquid across the surface using spreading means.

Preferably, the regions of liquid attracting material comprise a pattern whereby on placing a sheet of printing material over the surface, the pattern produced by the positioning of the liquid attracting material is transferred to the sheet of printing material.

By tailoring the surface as described previously it is possible to dictate the maximum size of the droplets held at the liquid attracting regions when the surface is tilted, or otherwise treated to remove excess liquid, and hence dictate the density and distribution of liquid, for example an ink.

The patterned region may be made by a continuous liquid attracting region, or more preferably by a plurality of discrete liquid attracting regions, e.g. a plurality of liquid attracting dots, surrounded by liquid repelling regions. The latter configuration better controlling the density and distribution of liquid, e.g. ink A surface as hereinbefore described has the added advantage that it may be self cleaning. The surface promotes droplet formation and those droplets may be directed under the influence of gravity. As the droplets move over the surface, small particles will be picked up by the droplets and thus removed from the surface.

In a further aspect the invention provides a water collection kit that may be assembled to form a collection system as described above, the kit comprising the surface, support means for supporting the surface at a desired inclination, and collection means. The kit may form part of a portable survival kit.

DESCRIPTION OF THE FIGURES

A number of embodiments of the invention will now be described by way of example only, with reference to the drawings, of which.

DETAILED DESCRIPTION OF THE INVENTION

Figure 1:
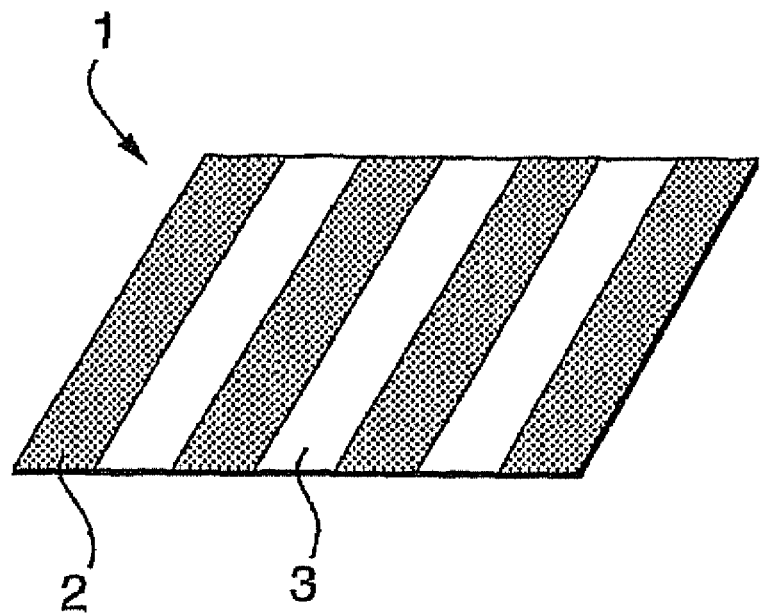
FIG. 1 is a schematic oblique illustration of a surface according to the present invention.

FIG. 1 shows a surface 1 having hydrophobic 2 and hydrophilic 3 regions.

The hydrophobic 2 and hydrophilic 3 regions alternate across the surface 1 and form a striped pattern. An efficient surface for the collection of water from wind-blown fogs consists of 600 to 800 micron width hydrophilic regions spaced a minimum of 800 microns apart on a hydrophobic substrate. This allows for the formation of droplets of a size whereby, under the influence of gravity on a tilted surface, the droplets flow downwards into a moderate headwind.

Figure 2:
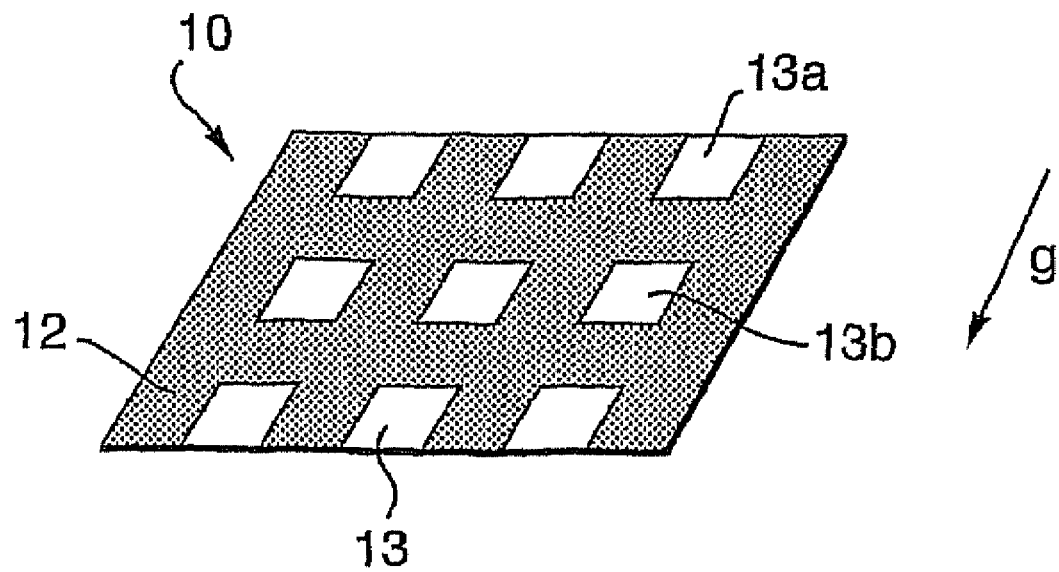
FIG. 2 shows an alternative surface according to the present invention.

FIG. 2 shows a surface 10 having hydrophobic 12 and hydrophilic 13 regions.

The hydrophobic regions 12 form a grid structure across the surface 10. The hydrophilic regions 13, are raised above the hydrophobic regions 12 forming a textured surface. When a vapour is passed over the surface 10, droplets within the vapour are attracted to the hydrophilic regions 13. After a period of time, larger droplets of liquid begin to form on the hydrophilic regions 13 as the small droplets in the vapour combine on the surface. When the droplets reach a certain size, they move from one hydrophilic region 13a to another hydrophilic region 13b under the influence of gravity.

FIGS. 3a to 3d show a textured surface 20 inclined to the horizontal plane having hydrophobic 22 and hydrophilic 23 regions.

Figure 3A:
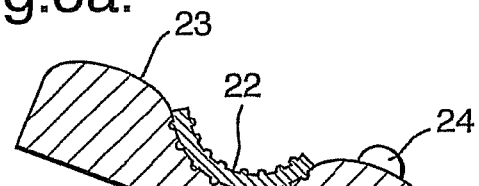
FIGS. 3a to 3d show a schematic sectional illustration of a textured surface according to the present invention.
Figure 3B:
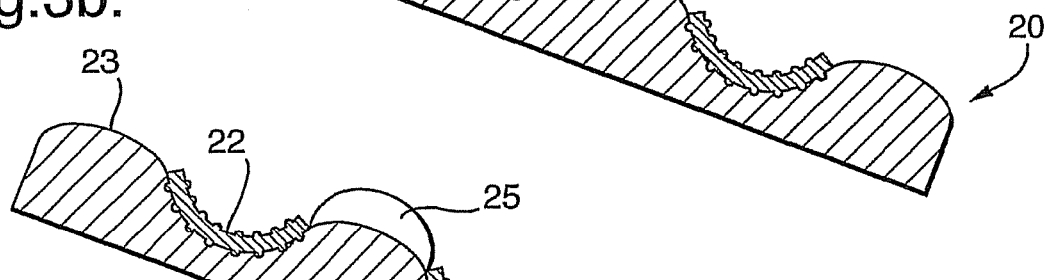
Figure 3C:
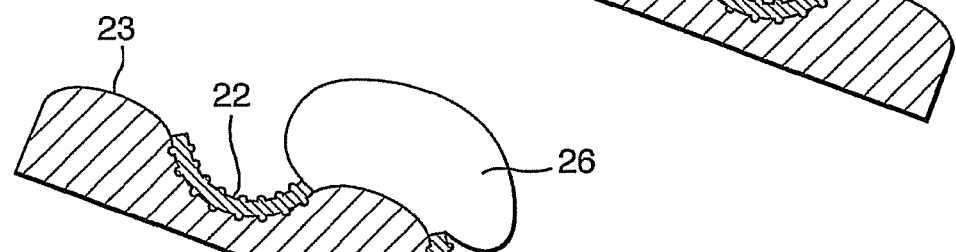
Figure 3D:
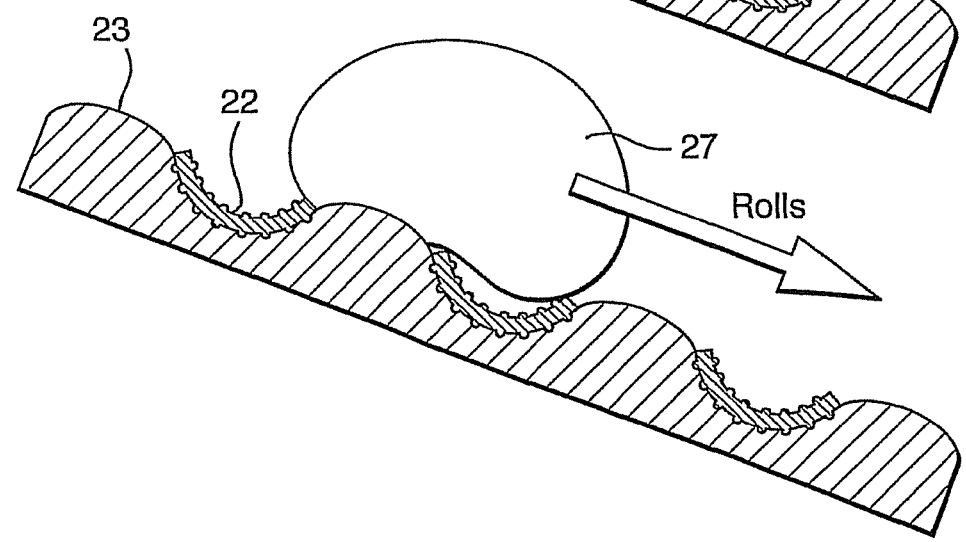

The hydrophilic regions 23 protrude in relation to the hydrophobic regions 22. When small droplets from a wind-blown vapour strike the tilted surface 20 then they may form a droplet 24 attached to a hydrophilic region 23. As such droplets grow larger (by joining with other droplets that attach to the surface or by getting larger), the drops will reach a point at which their surface contact area covers the hydrophilic region 23; as is shown in FIG. 3b, 25. Beyond this size they are gaining in mass without a corresponding increase in surface contact area, as shown in FIG. 3c, 26, thereafter, the droplet must now expand into the water-repelling hydrophobic regions of the surface, shown in FIG. 3d, 27. As this happens the gravitational forces on the droplet increase without a corresponding increase in surface adhesion, and eventually the droplet will move down the slope. By tailoring the slope of the surface, the size and spacing of the hydrophilic regions, and the exact hydrophobicity and hydrophilicity of the surface regions, droplets of a tailored diameter can be formed that can roll into the headwind of the wind-blown fog or mist and be collected at the lowest point of the tilted surface. In certain controlled environments, such as during distillation, the windspeed may also be controlled and tailored.

It should be noted that small droplets striking a hydrophobic surface would immediately be free to roll across that surface, but are likely to be blown away by the prevailing wind due to their small size, and may simply bounce from the surface back into the vapour. If the surface were entirely hydrophilic then the droplets would form a film that would move in a more random fashion, if at all, and limit the speed and efficiency of the water-collection process. When droplets move on such a tailored surface, they may also be guided by the hydrophilic regions, the surface attraction being sufficient to influence their direction and speed of motion. This would particularly be the case if the liquid attracting regions formed channels or stripes on the hydrophobic surface.

A textured surface as described above can manufactured using a variety of techniques. Clean (grease-free) glass surfaces are hydrophilic, and hence glass can be combined with hydrophobic materials such as waxes in order to produce appropriate patterns. Glass beads of 800 micron diameter can be partially embedded into a wax film to produce an array of hydrophilic hemispheres on a hydrophobic substrate. A clean glass surface can be made hydrophobic by exposure to materials such as hexamethyldisilazane, and this may be used in combination with contact masks to produce an appropriate pattern of hydrophilic regions. Surface texturing can be achieved via techniques such as the moulding and hot-pressing of plastics, which can subsequently be treated with hydrophilic/hydrophobic surface coatings.

Figure 4:
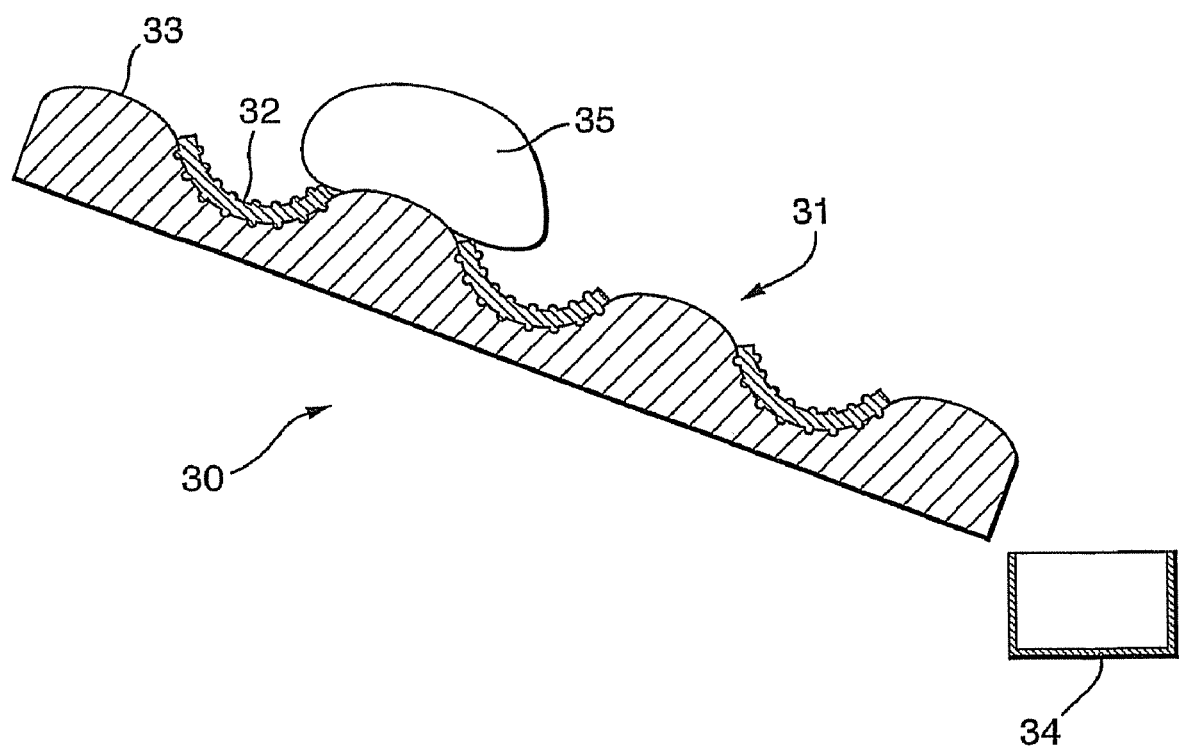
FIG. 4 shows a schematic sectional illustration of a textured surface suitable for collecting a liquid according to the present invention.

FIG. 4 shows a schematic sectional illustration of a textured surface 30 suitable for collecting liquid 35 having a surface 31 with hydrophobic 32 and hydrophilic 33 regions. A collector 34 is positioned below the surface.

When a vapour is passed over the surface 30, droplets in the vapour are attracted to the hydrophilic regions 33. After a period of time, larger droplets of liquid begin to form on the hydrophilic regions 33 as more and more small droplets from the vapour are attracted to the surface. When the droplets reach a certain size, they move under the influence of gravity. The hydrophilic regions 33 are tapered towards the collector 34 and the droplets tend to move from one hydrophilic region to another so the liquid from a number of hydrophilic regions 33 is collected in one collector 34.

An application of such a surface would be in distillation processes, for example, to purify a liquid. If a vapour is to be cooled and collected it is often passed through a tube that is enclosed in a cooling system (e.g. a second tube through which cold water flows). Vapour condenses on the walls of the inner tube and runs down to a collector. Since any vapour that condenses into a film on this inner wall insulates the remaining vapour from the cold surface, the inner tube is sometimes coated with a hydrophobic material to encourage condensed droplets to quickly flow downwards. However, small vapour droplets are more likely to be repelled from the hydrophobic walls, being deflected back into the vapour and hence slowing the collection process. Also, if the vapour is travelling in a specific direction (e.g. rising up a vertical pipe via convection currents) then small droplets are less likely to fall downwards against the vapour flow. For such applications a textured hydrophobic/liquid attracting surface such as those described above would improve the efficiency of the distillation process.

Figure 5A:
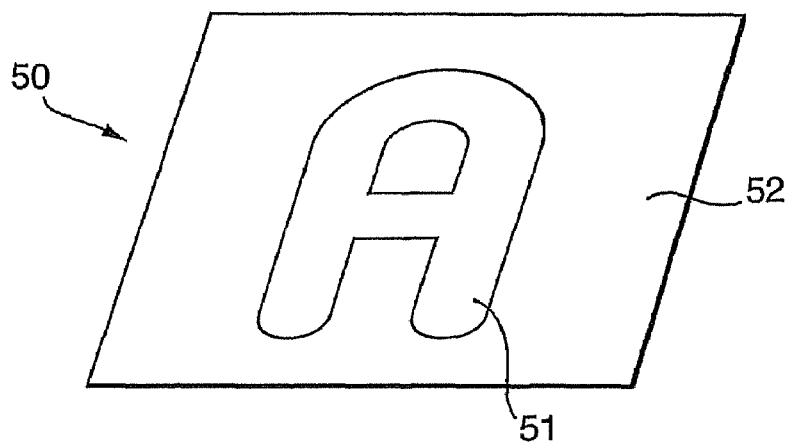
FIGS. 5a and 5b illustrates a surface suitable for a method of printing according to the present invention.

FIG. 5a illustrates a surface 50 having ink attracting 51 and ink repelling 52 regions. The ink repelling regions 52 form or define a recognisable shape. Ink 54 (not shown) is spread across the surface 50.

Figure 5B:
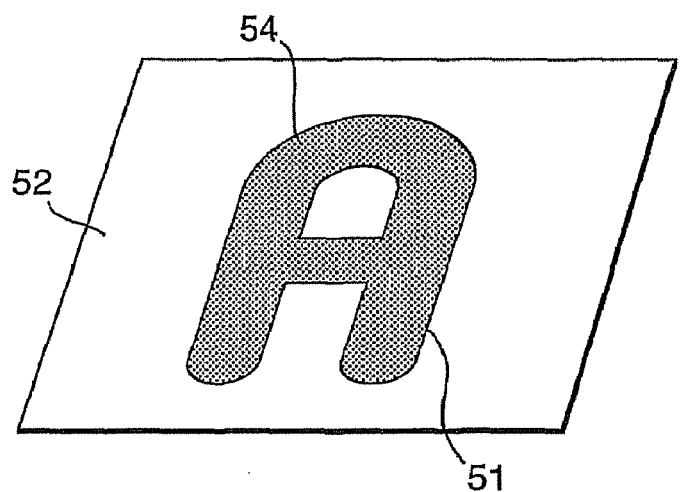

Ink 54 is attracted to the ink attracting 51 regions and repelled from the ink repelling regions 52 shown in FIG. 5b. This causes the ink 54 to only be present on the surface 50 in the ink attracting regions 51. A sheet of paper (not shown) placed over the surface 50 results in a transfer of ink from the surface 50 to the paper and thus in production of a print of the recognisable shape or negative thereof.

Whichever region is ink attracting and ink repelling depends on whether the ink is oil or water based.

Figure 5C:
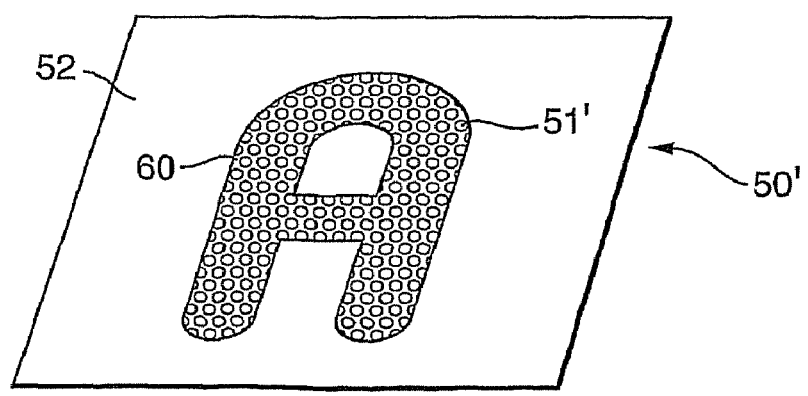
FIG. 5c shows an alternative surface suitable for a method of printing according to the present invention.

FIG. 5c shows an alternative surface 50' having a plurality of densely distributed discrete dot shaped ink attracting regions 51' in a surround or matrix of ink repelling material 60. These ink attracting regions 51' in a surround or matrix of ink repelling material 60 form a pattern (which is the letter "A" in the Figure). The pattern region is in a background of ink repelling material 52 as in the previous embodiment. Ink 54 (not shown) is spread across the surface 50'. As in the previous embodiment, ink is attracted to the regions 51'. Ink is repelled from regions 60 and 52. The discrete dot nature of the liquid attracting regions 51' in the "A" pattern better controls the density of the ink held on the pattern compared with the continuous liquid attracting region 51 of the FIGS. 5a and 5b embodiment. The pattern can then be printed by transfer to a sheet of paper as in the FIG. 5a/5b embodiment.

The invention claimed is:

1. A surface suitable for promoting the formation of droplets of water carried by or condensed out of a vapour, said surface comprising alternating regions of hydrophobic and hydrophilic material in at least one direction across the surface, wherein the diameter of the droplets is controlled by the size of the smallest dimension of the region of hydrophilic material and wherein the smallest dimension of the region of hydrophilic material is 600 to 800 micron.

2. A surface according to claim 1, wherein each hydrophilic region is isolated from other hydrophilic regions.

3. A surface according to claim 1, wherein the surface is textured such that the regions of hydrophilic material protrude in relation to the regions of hydrophobic material.

4. A surface according to claim 1, wherein the alternating regions form a striped pattern.

5. A surface according to claim 4 wherein the hydrophobic material forms a grid.

6. A surface according to claim 1, wherein the hydrophobic material is a waxy substance.

7. A surface according to claim 1, wherein the said smallest dimension of the hydrophilic material is in the said one direction.

8. A surface according to claim 1, wherein the arrangement of hydrophilic and hydrophobic regions on the surface is such that along any line drawn along the surface in the said one direction there will be alternating hydrophilic and hydrophobic regions.

9. A surface according to claim 1 that is substantially planar.

10. A water collection system comprising a surface according to claim 1 which is inclined to the horizontal plane, and collection means, whereby on movement of a vapour across the surface, water droplets within the vapour collect into larger droplets on the surface and are collected by the collection means.

11. A system for collecting a liquid comprising:
a surface which is inclined to the horizontal plane, said surface comprising alternating regions of liquid repelling and liquid attracting material in at least one direction across the surface; and
collection means, whereby on movement of a vapour across the surface, droplets within the vapour collect into larger droplets on the surface and are collected by the collection means.

12. A system according to claim 11, wherein the surface is suitable for promoting the formation of droplets of a liquid, and wherein the diameter of the droplets is controlled by the size of the smallest dimension of the liquid attracting material.

* * * * *